(12) United States Patent
Hong

(10) Patent No.: US 11,929,884 B2
(45) Date of Patent: Mar. 12, 2024

(54) NETWORK DATA COLLECTION METHOD AND DEVICE

(71) Applicant: ZTE CORPORATION, Guangdong (CN)

(72) Inventor: Yingjie Hong, Guangdong (CN)

(73) Assignee: ZTE CORPORATION (CN)

(*) Notice: Subject to any disclaimer, the term of this patent is extended or adjusted under 35 U.S.C. 154(b) by 72 days.

(21) Appl. No.: 17/764,328

(22) PCT Filed: Jul. 20, 2020

(86) PCT No.: PCT/CN2020/102965
§ 371 (c)(1),
(2) Date: Mar. 28, 2022

(87) PCT Pub. No.: WO2021/063083
PCT Pub. Date: Apr. 8, 2021

(65) Prior Publication Data
US 2022/0337486 A1     Oct. 20, 2022

(30) Foreign Application Priority Data
Sep. 30, 2019  (CN) .......................... 201910944032.X

(51) Int. Cl.
*G06F 15/173*     (2006.01)
*H04L 41/02*      (2022.01)
(Continued)

(52) U.S. Cl.
CPC ............ *H04L 41/14* (2013.01); *H04L 41/024* (2013.01); *H04L 41/0893* (2013.01); *H04L 43/06* (2013.01)

(58) Field of Classification Search
CPC ............... H04L 41/14; H04L 41/024; H04L 41/0893; H04L 43/06
(Continued)

(56) References Cited

U.S. PATENT DOCUMENTS

2019/0356558 A1* 11/2019 Han .................... H04L 41/14
2021/0344570 A1* 11/2021 Vaishnavi ............ H04L 47/82

FOREIGN PATENT DOCUMENTS

| CN | 104079436 A | 10/2014 |
| CN | 104244227 A | 12/2014 |
| CN | 105578488 A | 5/2016 |
| CN | 106992894 A | 7/2017 |

(Continued)

OTHER PUBLICATIONS

Intellectual Property India, Examination Report for Application No. 202227023380, report dated Sep. 6, 2022.
(Continued)

*Primary Examiner* — Lan Dai T Truong
(74) *Attorney, Agent, or Firm* — McDonald Hopkins LLC

(57) ABSTRACT

Provided are a network data collection method, device and system. The network data collection method includes the following. A source Network Data Analytics Function (NWDAF) sends a network function data collection request to a target NWDAF, where the network function data collection request includes a data collection assistance parameter of at least one network function from which data collection is requested. The source NWDAF receives a network function data collection response sent by the target NWDAF, where the network function data collection response includes network data fed back by the at least one network function.

20 Claims, 9 Drawing Sheets

(51) Int. Cl.
  *H04L 41/0893* (2022.01)
  *H04L 41/14* (2022.01)
  *H04L 43/06* (2022.01)

(58) Field of Classification Search
  USPC ......................................................... 709/224
  See application file for complete search history.

(56) References Cited

FOREIGN PATENT DOCUMENTS

| | | | |
|---|---|---|---|
| CN | 109842906 A | | 6/2019 |
| CN | 109922073 A | | 6/2019 |
| CN | 109996303 A | | 7/2019 |
| CN | 110677299 A | | 1/2020 |
| EP | 2779718 B1 | | 8/2018 |
| JP | 2011243110 A | | 12/2011 |
| JP | 6164436 B1 | | 7/2017 |
| WO | 2019119435 A1 | | 6/2019 |
| WO | WO-2020224759 A1 | * | 11/2020 ............. H04L 41/14 |

OTHER PUBLICATIONS

International Search Report and Written Opinion dated Sep. 29, 2020; International Patent Application No. PCT/CN2020/102965 filed Jul. 20, 2020.

Office Action dated Apr. 5, 2023; Japanese Patent Application No. 2022-517235.

S2-1903913, 3GPP TSG-SA WG Meeting #132, "Adding Setup of Network Map for Data Collection and Triggering of NWDAF Data Collection." Apr. 8-12, 2019. Xi'an China.

Ericsson, "Analytics with an associated NWDAF instance," 3GPP Draft, S2-1810228_ENA_SOLUTION_7, Mobile Competence Centre, 2018, China.

"3rd generation partnership project; techincal specification group core network and terminals; 5G system; Policy and Charging Control signalling flows and QoS parameter mapping; Stage 3 (Release 16)," 3GPP Draft, Mobile Competence Centre, 2019, France.

Zhaowen, "Research on key technologies of 5G network operation and maintenance automation" China Mobile Communications Group Guangdong Co., Ltd., China.

Supplementary European Search Report for Application 20871110, PCT/CN2020/102965, dated Sep. 19, 2023, 10 pgs., European Patent Office, Germany.

State Intellectual Property Office of People's Republic of China, Notification of First Office Action for Application No. 201910944032, report dated Aug. 15, 2023, China.

State Intellectual Property Office of People's Republic of China, Notification of First Search Report for Application No. 201910944032, report dated Aug. 9, 2023, China.

* cited by examiner

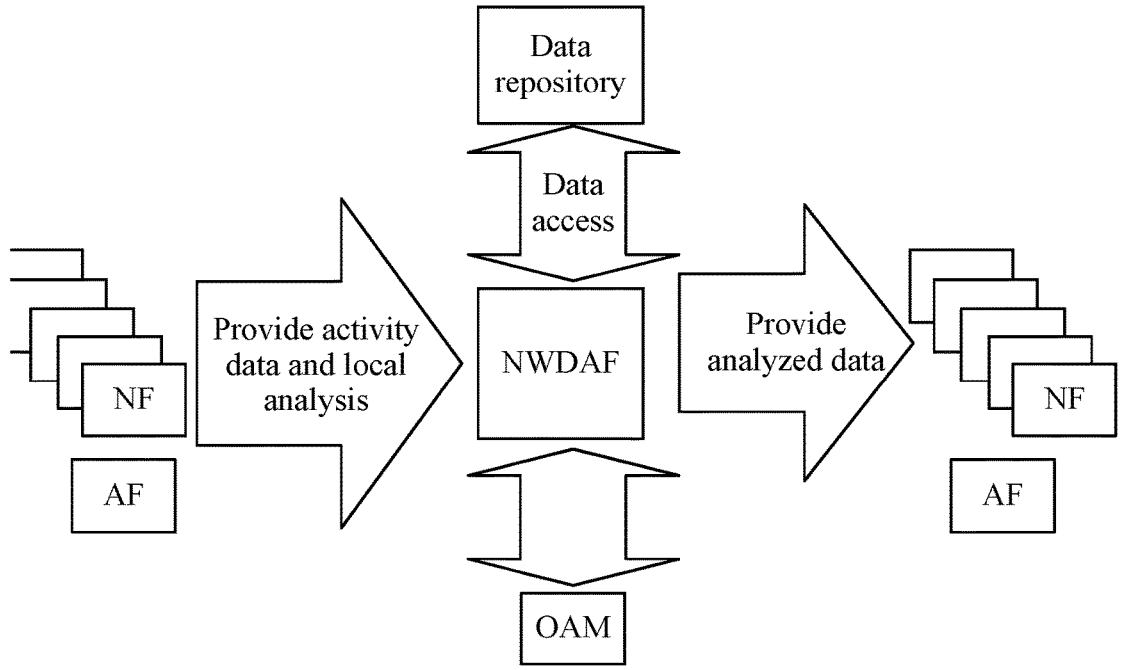

FIG. 1

| A source NWDAF sends a network function data collection request to a target NWDAF, where the network function data collection request includes a data collection assistance parameter of at least one network function | S2010 |

| The source NWDAF receives a network function data collection response sent by the target NWDAF, where the network function data collection response includes network data fed back by the at least one network function | S2020 |

FIG. 2

NETWORK DATA COLLECTION METHOD AND DEVICE

CROSS-REFERENCE TO RELATED APPLICATIONS

This application is a U.S. National Stage Application, filed under 35 U.S.C. 371 of International Patent Application No. PCT/CN2020/102965 filed Jul. 20, 2020, which claims priority to Chinese Patent Application No. 201910944032.X filed with the China National Intellectual Property Administration (CNIPA) on Sep. 30, 2019, the disclosures of each of which are incorporated herein by reference in their entireties.

This application claims priority to Chinese Patent Application No. 201910944032.X filed with the China National Intellectual Property Administration (CNIPA) on Sep. 30, 2019, the disclosure of which is incorporated herein by reference in its entirety.

TECHNICAL FIELD

The present application relates to wireless communication networks, for example, a network data collection method and device.

BACKGROUND

In the 5th Generation Mobile Communication System (5G), the Network Data Analytics Function (NWDAF) is introduced. The NWDAF can collect network data from the Operations Administration and Maintenance (OAM), the Application Function (AF) and the 5G Network Function (NF), and feeds back network data analysis results after analyzing the network data.

However, in a practical deployment of a network, the NWDAF needs to be deployed according to the service area, for example, according to a network slice or according to a geographical location. At the same time, different operators also deploy their respective NWDAFs. Therefore, multiple different NWDAFs are deployed in the network, and the different NWDAFs serve different areas and also serve different network functions. As a result, one NWDAF can only collect network data of the network function within the service area, which is not conducive to the unified management and application of the network.

SUMMARY

The present application provides a network data collection method, device and system, so as to improve the efficiency of network data collection and provide a basis for unified management and operation of a wireless network.

The present application provides a network data collection method including the following.

A source NWDAF sends a network function data collection request to a target NWDAF, where the network function data collection request includes a data collection assistance parameter of at least one network function from which data collection is requested.

The source NWDAF receives a network function data collection response sent by the target NWDAF, where the network function data collection response includes network data fed back by the at least one network function.

In a possible implementation, before the source NWDAF sends the network function data collection request to the target NWDAF, the method further includes the following.

The source NWDAF sends a query request message to a Network Repository Function (NRF), where the query request message includes NWDAF selection assistance information, and the NWDAF selection assistance information includes home information of the at least one network function.

The source NWDAF receives a query response message sent by the NRF, where the query response message includes information of the target NWDAF, and the at least one network function is located within a service area of the target NWDAF.

In a possible implementation, the query response message includes information of multiple target NWDAFs, and the at least one network function is located within service areas of the multiple target NWDAFs, respectively.

In a possible implementation, sending the source NWDAF the network function data collection request to the target NWDAF includes the following.

The source NWDAF sends network function data collection requests respectively to the multiple target NWDAFs, where each of the network function data collection requests includes the data collection assistance parameter of at least one network function.

Receiving the source NWDAF the network function data collection response sent by the target NWDAF includes the following.

The source NWDAF receives network function data collection responses respectively sent by the multiple target NWDAFs, where each of the network function data collection responses includes the network data fed back by at least one network function.

In a possible implementation, the home information of the at least one network function includes at least one of the following pieces of information: slice information of one of the at least one network function, an identifier of one of the at least one network function, or location information of one of the at least one network function.

In a possible implementation, before the source NWDAF sends the query request message to the NRF, the method further includes the following.

The source NWDAF determines whether to directly collect the network data of the at least one network function.

Sending the source NWDAF the query request message to the NRF includes the following.

In a case where the source NWDAF is not capable of directly collecting the network data of the at least one network function, the source NWDAF sends the query request message to the NRF.

In a possible implementation, the data collection assistance parameter includes at least one of the following pieces of information: addressing information of a network function, a data collection strategy of a network function, content of data required to be collected from a network function, or a receiving object of collected data of a network function.

In a possible implementation, before the source NWDAF sends the network function data collection request to the target NWDAF, the method further includes the following.

The source NWDAF receives a service analysis request sent by an NWDAF consumer.

The source NWDAF determines the data collection assistance parameter of the at least one network function from which data is required to be collected according to the service analysis request.

After the source NWDAF receives the network function data collection response sent by the target NWDAF, the method further includes the following.

The source NWDAF performs service analysis processing and sends a service analysis result to the NWDAF consumer.

In a possible implementation, the NWDAF consumer includes any network function using a service capability of the source NWDAF.

In a possible implementation, the method further includes the following. The source NWDAF sends a registration request message or an update request message to the NRF, where the registration request message or the update request message includes service area information of the source NWDAF.

In a possible implementation, the service area information of an NWDAF includes at least one of the following pieces of information: slice information of an NWDAF service, a network function identifier of an NWDAF service, or location information of an NWDAF service.

In a possible implementation, the registration request message or the update request message further includes at least one of the following pieces of information: a network function type of an NWDAF, a network function identifier of an NWDAF, a service capability supported by an NWDAF, or a home operator identifier of an NWDAF.

The present application further provides a network data collection method including the following.

An NRF receives a query request message sent by a source NWDAF, where the query request message includes NWDAF selection assistance information, and the NWDAF selection assistance information includes home information of at least one network function.

The NRF sends a query response message to the source NWDAF, where the query response message includes information of a target NWDAF, and the at least one network function is located within a service area of the target NWDAF.

In a possible implementation, the query response message includes information of multiple target NWDAFs, and the at least one network function is located within service areas of the multiple target NWDAFs, respectively.

In a possible implementation, the home information of the at least one network function includes at least one of the following pieces of information: slice information of the at least one network function, an identifier of the at least one network function, or location information of the at least one network function.

In an implementation, the method further includes the following.

The NRF receives a registration request message or an update request message sent by the source NWDAF and/or the target NWDAF, where the registration request message or the update request message includes service area information of the source NWDAF and/or the target NWDAF.

In an implementation, the service area information of an NWDAF includes at least one of the following pieces of information: slice information of an NWDAF service, a network function identifier of an NWDAF service, or location information of an NWDAF service.

In an implementation, the registration request message or the update request message further includes at least one of the following pieces of information: a network function type of an NWDAF, a network function identifier of an NWDAF, a service capability supported by an NWDAF, or a home operator identifier of an NWDAF.

The present application further provides a network data collection device configured at a source NWDAF. The network data collection device includes a sending module and a reception module.

The sending module is configured to send a network function data collection request to a target NWDAF, where the network function data collection request includes a data collection assistance parameter of at least one network function from which data collection is requested.

The reception module is configured to receive a network function data collection response sent by the target NWDAF, where the network function data collection response includes network data fed back by the at least one network function.

The present application further provides a network data collection device configured at an NRF. The network data collection device includes a reception module and a sending module.

The reception module is configured to receive a query request message sent by a source NWDAF, where the query request message includes NWDAF selection assistance information, and the NWDAF selection assistance information includes home information of at least one network function.

The sending module is configured to send a query response message to the source NWDAF, where the query response message includes information of a target NWDAF, and the at least one network function is located within a service area of the target NWDAF.

The present application further provides a network data collection system including a source NWDAF, a target NWDAF and an NRF.

The source NWDAF includes the network data collection device shown in FIG. 12.

The NRF includes the network data collection device shown in FIG. 13.

BRIEF DESCRIPTION OF DRAWINGS

FIG. 1 is a schematic diagram of an overall framework of 5G network automation;

FIG. 2 is a flowchart of a network data collection method according to an embodiment;

DETAILED DESCRIPTION

Figure 3:
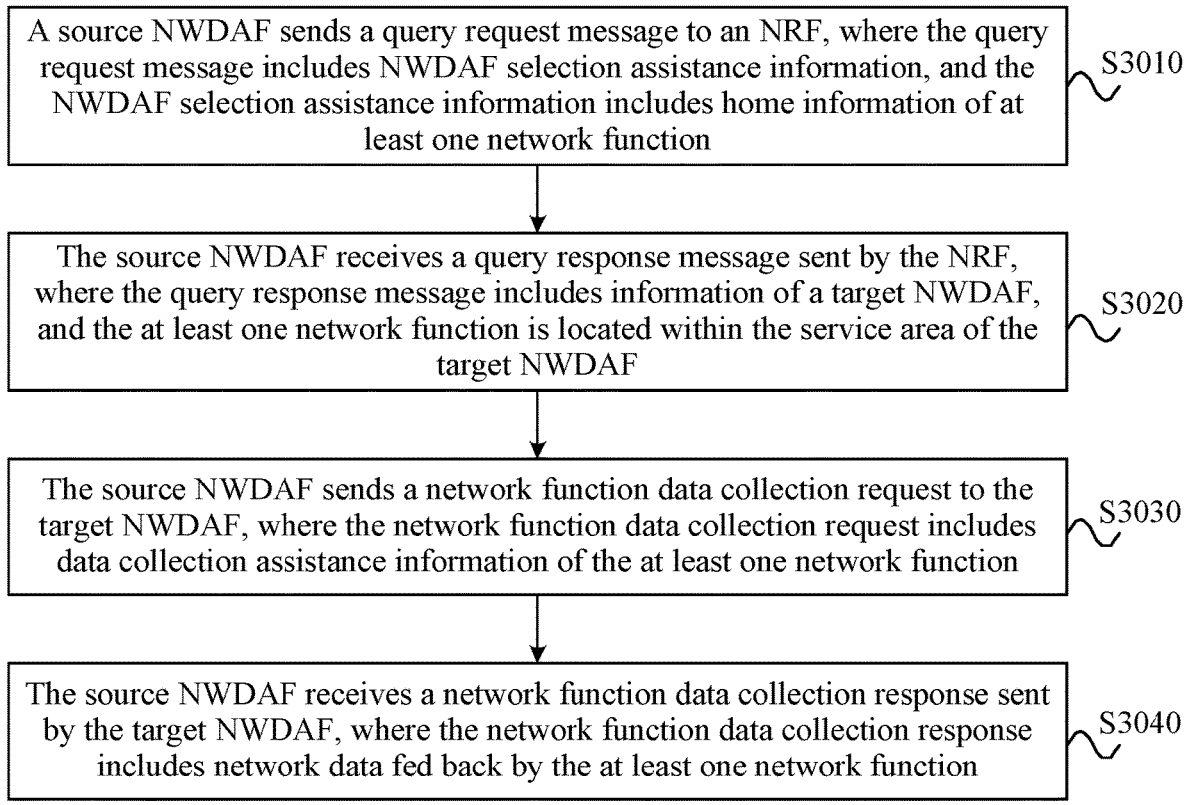
FIG. 3 is a flowchart of another network data collection method according to an embodiment.

Embodiments of the present application are described hereinafter in conjunction with drawings.

In the 5G network, the NWDAF is introduced. The NWDAF may collect network data from other network functions and feed back network data analysis results after analyzing the network data. As shown in FIG. 1, FIG. 1 is a schematic diagram of an overall framework of 5G network automation. FIG. 1 describes that the NWDAF collects data from the OAM and the AF of an operator and other 5G network functions. For collection of the data of the OAM, the NWDAF may reuse the mechanisms and interfaces defined by the 3rd Generation Partnership Project (3GPP). The AF may perform information interaction with the NWDAF through the Network Exposure Function (NEF) according to the network deployment or may directly access the NWDAF by using a service-based interface. The NWDAF may access network data from a data store, such as a Unified Data Repository (UDR). For the NF of the 3GPP, the NWDAF acquires network data during communication by using the service interface defined based on the 3GPP. Based on the preceding data collection, the NWDAF performs data analysis and provides analysis results to the AF, the OAM, and the NF of the 3GPP.

The main Network Functions (NFs) of the 3GPP include, but are not limited to, the following types of network functions: an Access Management Function (AMF), a Session Management Function (SMF), a Policy Control Function (PCF), Unified Data Management (UDM), a Unified Data Repository (UDR), a User Plane Function (UPF), a Network Exposure Function (NEF), a Network Repository Function (NRF), and the NWDAF. The AMF belongs to the common control plane function within a core network and terminates Non-Access Stratum (NAS) messages between all users and the network. One User Equipment (UE) has only one AMF, which is responsible for user mobility management, UE state (such as reachability) management, etc. The SMF is responsible for functions such as session establishment, modification and deletion, and control of charging and policy execution of the PCF. The PCF is responsible for formulating a policy for a terminal according to a subscription of a user, a current location of a UE and application-related information, and the policy includes a routing policy, a Quality of Service (QoS) policy, a charging policy, etc. The UDM has such functions as unified data management and permanent storage of user subscription data. The UDR is mainly used for storing user subscription data, policy data and the like managed by the UDM and the PCF. The UPF is a function belonging to the user plane within the core network, and is an anchor of the user plane of the core network and an interface for data transmission with an external Data Network (DN). The UPF performs execution of PCF policy rules of the user plane. The NEF is used for exposing the capability and event of the NFs of the 3GPP to other NFs or an external AF, providing the capability of the AF to provision the NFs of the 3GPP, and achieving information mapping between the 3GPP network and the external network; the AF refers to an application accessing the 3GPP. The NRF is used for maintaining NF folders (including NF entities and service descriptions supported by the NF entities), supporting the service discovery function, etc. The NWDAF supports data collection from the NF, the AF and the OAM, service registration, metadata exposure to the NF/AF and analysis results exposure to the NF/AF/OAM. The OAM may be the OAM of the core network, and/or the OAM of a Radio Access Network (RAN).

However, in an actual deployment, the NWDAF network function may need to be deployed according to the service area, for example, according to a slice or according to a geographical location (a province or a city). Moreover, different operators respectively deploy their own NWDAFs. In this scene, different NWDAFs serve different areas and different network functions, so collecting data from different network functions needs to be achieved through different NWDAFs, which is not conducive to the unified management and application of the network.

FIG. 2 is a flowchart of a network data collection method according to an embodiment. As shown in FIG. 2, the method provided in this embodiment includes the following.

In S2010, a source NWDAF sends a network function data collection request to a target NWDAF, where the network function data collection request includes a data collection assistance parameter of at least one network function.

The network data collection provided in the embodiment is applied to an NWDAF in a wireless communication network. The NWDAF is a logical function in the network and may be deployed in any network device in the network, or the NWDAF is an independent device in the network. In the wireless communication network, different operators need to respectively deploy independent NWDAFs in their respective networks, and the same operator will also deploy multiple NWDAFs in the network according to the geographical location or the network slice for the convenience of management. It can be seen from the architecture diagram shown in FIG. 1 that the NWDAF may only collect and analyze data of various NFs in a network to which the NWDAF belongs.

The network data collection method provided in the embodiment is performed by one NWDAF in the network and the one NWDAF is referred to as a source NWDAF. If the network function from which data is required to be collected by the source NWDAF is not within the service area of the source NWDAF, the source NWDAF cannot directly collect network data of the network function. At this time, the source NWDAF needs to collect the network data of the network function through a target NWDAF. The target NWDAF is an NWDAF serving the network function, that is, the network function is a network function located within the service area of the target NWDAF. The source NWDAF may collect the network data of the network function according to an instruction of another network function. A network function that sends a service request to an NWDAF may be referred to as an NWDAF consumer. The NWDAF consumer includes a network function that uses any service capability of the NWDAF, such as the NF, AF, OAM and the like shown in FIG. 1. There may be one or more network functions from which network data is required to be collected by the source NWDAF, and one or more network functions may be located within the service area of the target NWDAF. Moreover, the network function from which network data is required to be collected by the source NWDAF may also be located within service areas of multiple NWDAFs. Therefore, the network function data collection request may also collect network data of multiple network functions from multiple target NWDAFs simultaneously. The network function data collection request includes a data collection assistance parameter of at least one network function from which data is required to be collected. The at least one network function is located within service areas of multiple target NWDAFs, respectively. Multiple target NWDAFs may exist, but the method by which the source NWDAF collects data in each target NWDAF is the same.

The network function data collection request includes the data collection assistance parameter of the at least one network function from which data collection is requested.

The data collection assistance parameter of the at least one network function includes at least one of the following pieces of information: addressing information of the network function, a data collection strategy of the network function, content of data required to be collected from the network function, or a receiving object of collected data of the network function. The addressing information of the network function is used for determining the location of the network function, for example, including an identifier, an Internet Protocol (IP) address and a port number of the network function and other identification information capable of determining the network function. The data collection strategy of the network function includes, for example, a time requirement of the network function. The content of the data required to be collected from the network function represents content of the data required to be collected from the network function. The receiving object of the collected data of the network function represents a recipient of the collected data.

If multiple network functions exist, the network function data collection request may simultaneously include data collection assistance parameters of the multiple network functions.

In S2020, the source NWDAF receives a network function data collection response sent by the target NWDAF, where the network function data collection response includes network data fed back by the at least one network function.

After receiving the network function data collection request sent by the source NWDAF, the target NWDAF may collect the network data of the at least one network function. The target NWDAF collects the required network data of the at least one network function according to an instruction for network function data collection sent by the source NWDAF, and then generates and feeds back the network function data collection response to the source NWDAF. When receiving the network function data collection response, the source NWDAF learns the required-to-be-collected network data fed back by the at least one network function, so as to achieve the network data collection across NWDAFs. In this way, the NWDAF consumer deployed at any location in the network may collect network data of a network function in the whole network through an NWDAF in the area to which the NWDAF consumer belongs. Therefore, the efficiency of network data collection is improved, and a basis is provided for the unified management and operation of the wireless network.

According to the network data collection method provided in the embodiment, the source NWDAF sends the network function data collection request to the target NWDAF, where the network function data collection request includes the data collection assistance information of the at least one network function from which data collection is requested; and then the source NWDAF receives the network function data collection response sent by the target NWDAF, where the network function data collection response includes the network data fed back by the at least one network function. In this way, the NWDAF consumer deployed at any location in the network may collect network data of a network function in the whole network through an NWDAF in the area to which the NWDAF consumer belongs. Therefore, the efficiency of network data collection is improved, and a basis is provided for the unified management and operation of the wireless network.

FIG. 3 is a flowchart of another network data collection method according to an embodiment. As shown in FIG. 3, the method provided in this embodiment includes the following.

In S3010, a source NWDAF sends a query request message to an NRF, where the query request message includes NWDAF selection assistance information, and the NWDAF selection assistance information includes home information of at least one network function.

Since the at least one network function from which data is required to be collected by the source NWDAF is not located within the service area of the source NWDAF, the source NWDAF cannot directly collect network data of the at least one network function. The NRF is a function for storing data related to various network functions in the network, and corresponding relationships between the various network functions and NWDAFs are also stored in the NRF. Before collecting the network data of the at least one network function, the source NWDAF may first send the query request message to the NRF, where the query request message includes the NWDAF selection assistance information, and the NWDAF selection assistance information includes the home information of the at least one network function. Then, after receiving the query request message, the NRF may determine the service area of which NWDAF the at least one network function is located within according to the home information of the at least one network function.

The NWDAF selection assistance information is related information for assisting in selecting the NWDAF to which the at least one network function belongs, and includes the home information of the at least one network function. The NWDAF selection assistance information may further include the network function type of an NWDAF. The NWDAF selection assistance information includes at least one of the following pieces of information: slice information of the network function, an identifier of the network function, or location information of the network function. The slice information of the network function represents the slice information to which the network function belongs. For example, through slice information of an NWDAF service and the slice information of the network function, it may be determined whether the network function is located within the service area of the NWDAF. The identifier of the network function represents various pieces of network function information, for example, a network function identifier, an AF identifier or an OAM identifier. The location information of the network function represents a geographical location, a tracking area, an IP address, a cell, operator information, vendor information and other information of the at least one network function for effectively distinguishing between service areas.

In S3020, the source NWDAF receives a query response message sent by the NRF, where the query response message includes information of a target NWDAF, and the at least one network function is located within the service area of the target NWDAF.

After receiving the query request message sent by the source NWDAF, the NRF queries information of the NWDAF to which the at least one network function belongs, that is, the information of the target NWDAF, according to the NWDAF selection assistance information. For example, an NWDAF serving the network function is queried by the NRF according to the identifier of the network function of the query request message, or the NWDAF serving the slice or the location is queried by the NRF according to the slice information or the location information of the network function, and then the NWDAF determines the NWDAF serving the network function according to an association between network slices and network functions. Then, the source NWDAF receives the query response message sent by the NRF, where the query response message includes the information of the target NWDAF. The information of the target NWDAF includes, for example, an identifier of the target NWDAF and/or capability information of the target NWDAF, etc.

In an embodiment, there are multiple target NWDAF, so that the query response message includes information of the multiple target NWDAFs, and the at least one network function is located within service areas of the multiple target NWDAFs, respectively. That is, the query request message sent by the source NWDAF to the NRF may simultaneously query NWDAFs to which multiple network functions belong, and the NWDAFs to which the multiple network functions belong may be different from each other. Correspondingly, the query response message sent by the NRF to the source NWDAF includes the information of the multiple target NWDAFs. That is, the NRF may feed back the information of the multiple different target NWDAFs to the source NWDAF in one query response message, and the NRF may also feed back the information of the multiple different target NWDAFs to the source NWDAF respectively in multiple different query response messages.

In S3030, the source NWDAF sends a network function data collection request to the target NWDAF, where the network function data collection request includes data collection assistance information of the at least one network function.

In S3040, the source NWDAF receives a network function data collection response sent by the target NWDAF, where the network function data collection response includes network data fed back by the at least one network function.

After the information of the target NWDAF is queried, the source NWDAF may send the network function data collection request to the target NWDAF, and receive the network function data collection response sent by the target NWDAF, thereby collecting the network data fed back by the network function. When information of multiple NWDAF is queried by the source NWDAF through the query request message, the source NWDAF may send network function data collection requests respectively to the multiple different NWDAFs, and receives network function data collection responses respectively sent by the multiple target NWDAFs, so that the required-to-be-collected network data fed back by the network functions can be received from the multiple different NWDAFs.

In an embodiment, before the source NWDAF sends the query request message to the NRF, the method further includes that the source NWDAF determines whether to directly collect the network data of the at least one network function.

Figure 4:
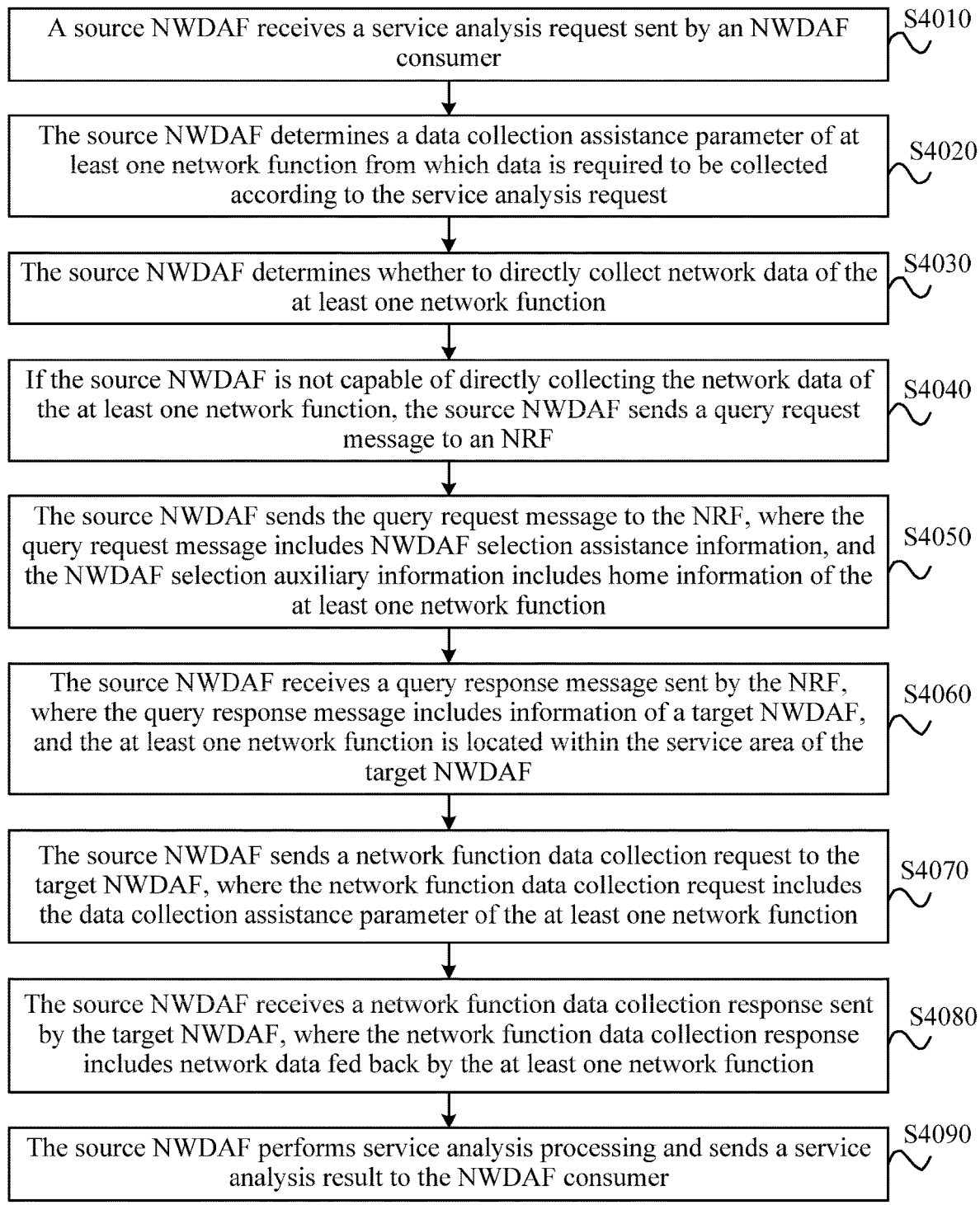
FIG. 4 is a flowchart of another network data collection method according to an embodiment.

FIG. 4 is a flowchart of another network data collection method according to an embodiment. As shown in FIG. 4, the method provided in this embodiment includes the following.

In S4010, a source NWDAF receives a service analysis request sent by an NWDAF consumer.

The NWDAF consumer includes a network function that uses any service capability of the source NWDAF. When the NWDAF consumer needs to analyze any service in the network, the source NWDAF receives the service analysis request sent by the NWDAF consumer. Alternatively, the source NWDAF receives a subscription message sent by the NWDAF consumer. The service analysis request and the subscription message include at least the following parameter combinations: a service type, analysis target association information and an analysis result notification object. The analysis target association information is assistance information used to determine a network function from which data is required to be collected for service type analysis, for example, location information, a network function identifier, a UE identifier, an AF identifier, slice information or other association information that may be used for assisting in determining the analysis target.

In S4020, the source NWDAF determines a data collection assistance parameter of at least one network function from which data is required to be collected according to the service analysis request.

After receiving the service analysis request, the source NWDAF determines from which network functions data is collected for service analysis according to the current service analysis request. For example, the source NWDAF may determine a type of the network functions from which data is required to be collected according to service type analysis, and determine the network function from which data is required to be collected according to the analysis target association information via the UDM, an NRF, a Binding Support Function (BSF), an AMF or an NEF. After the source NWDAF analyzes the service analysis request, there may be multiple determined network functions from which data is required to be collected, and the multiple network functions may be located within service areas of different target NWDAFs. The source NWDAF may send a query request to the NRF to acquire information of each NWDAF and perform data collection. The network function from which data is required to be collected includes at least one network function. That is, at least one network function of the service area of the target NWDAF is taken as an example for explanation, and data collection methods of network functions located within service areas of other NWDAFs are the same as each other.

In S4030, the source NWDAF determines whether to directly collect network data of the at least one network function.

In S4040, when the source NWDAF is not capable of directly collecting the network data of the at least one network function, the source NWDAF sends a query request message to an NRF.

In S4050, the source NWDAF sends the query request message to the NRF, where the query request message includes NWDAF selection assistance information, and the NWDAF selection assistance information includes home information of the at least one network function.

In the embodiment, both the source NWDAF and the target NWDAF are already registered in the NRF. The source NWDAF and the target NWDAF may belong to the same Public Land Mobile Network (PLMN) or may belong to different PLMNs. In the embodiment, it is assumed that the network function is located within the service area of the target NWDAF and not within the service area of the source NWDAF. The at least one network function in the embodiment represents an NF, an AF or an OAM of the 3GPP.

In S4060, the source NWDAF receives a query response message sent by the NRF, where the query response message includes information of the target NWDAF, and the at least one network function is located within the service area of the target NWDAF.

In S4070, the source NWDAF sends a network function data collection request to the target NWDAF, where the network function data collection request includes the data collection assistance parameter of the at least one network function.

In S4080, the source NWDAF receives a network function data collection response sent by the target NWDAF, where the network function data collection response includes network data fed back by the at least one network function.

In S4090, the source NWDAF performs service analysis processing and sends a service analysis result to the NWDAF consumer.

After receiving the network function data collection response, the source NWDAF may acquire the network data fed back by the at least one network function. The source NWDAF performs service analysis processing according to the received data to obtain the service analysis result, and then sends the service analysis result to the NWDAF consumer, thereby completing the service analysis across NWDAFs. If the source NWDAF needs to collect data from network functions located within multiple different NWDAFs, the source NWDAF performs service analysis processing after receiving the data fed back by all network functions from which data is required to be collected, and then the analysis result may be obtained. In this way, for various network functions in the network, service analysis can be performed at any location in the network, so that the centralized management and operation of the network are achieved.

In an embodiment, when the source NWDAF is registered or updated in the network, the source NWDAF sends a registration request message or an update request message to the NRF, where the registration request message or the update request message includes service area information of the source NWDAF. The service area information of an NWDAF includes at least one of the following pieces of information: slice information of an NWDAF service, a network function identifier of an NWDAF service, or location information of an NWDAF service. The registration request message or the update request message further includes at least one of the following pieces of information: a network function type of an NWDAF, a network function identifier of an NWDAF, a service capability supported by an NWDAF, or a home operator identifier of an NWDAF.

Figure 5:
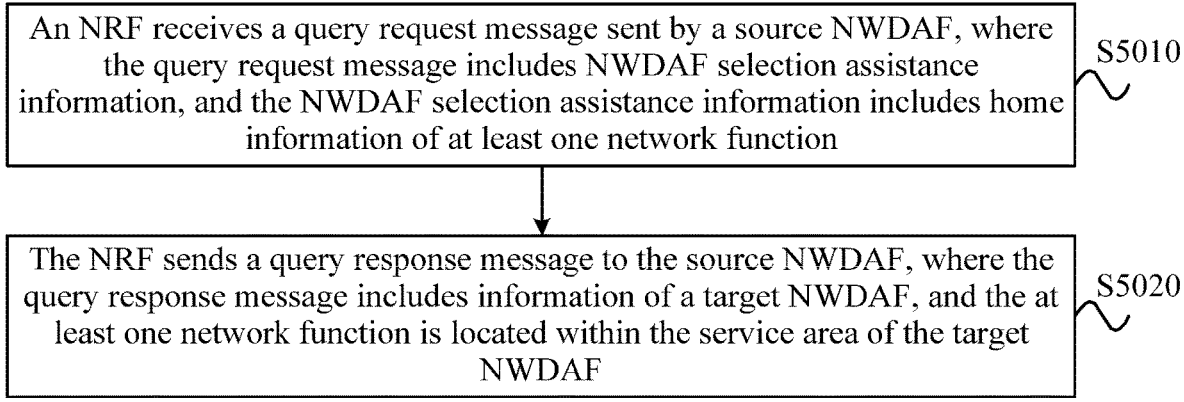
FIG. 5 is a flowchart of another network data collection method according to an embodiment.

FIG. 5 is a flowchart of another network data collection method according to an embodiment. As shown in FIG. 5, the method provided in this embodiment includes the following.

In S5010, an NRF receives a query request message sent by a source NWDAF, where the query request message includes NWDAF selection assistance information, and the NWDAF selection assistance information includes home information of at least one network function.

In S5020, the NRF sends a query response message to the source NWDAF, where the query response message includes information of a target NWDAF, and the at least one network function is located within the service area of the target NWDAF.

The network data collection provided in the embodiment is applied to an NRF in a wireless communication network. The NRF is a logical function in the network and may be deployed in any network device in the network, or the NRF is an independent device in the network. In the wireless communication network, different operators need to respectively deploy independent NWDAFs in their respective networks, and the same operator will also deploy multiple NWDAFs in the network according to the geographical location or the network slice for the convenience of management. It can be seen from the architecture diagram shown in FIG. 1 that the NWDAF may only collect and analyze data of various NFs within the service area of the NWDAF in the network to which the NWDAF belongs.

To achieve network data collection between multiple NWDAFs, each NWDAF needs to be capable of learning that the network function from which data is required to be collected is located within the service area of which NWDAF. The NRF is a function for storing data related to various network functions in the network, and corresponding relationships between the various network functions and NWDAFs are also stored in the NRF. When it is required to collect network data of network functions located within service areas of other NWDAFs, each NWDAF may first send a query request to the NRF, and request the NRF to feed back information of the NWDAF to which the network function belongs, and the data is required to be collected from the network function.

It is taken as an example in which the source NWDAF is the NWDAF sending the query request message and the at least one network function requested for query is located within the service area of the target NWDAF. The query request message includes the NWDAF selection assistance information, and the NWDAF selection assistance information includes the home information of the at least one network function. After receiving the query request message, the NRF may determine the service area of which NWDAF the at least one network function is located within according to the home information of the at least one network function.

The NWDAF selection assistance information is related information for assisting in selecting the NWDAF to which the at least one network function belongs, and includes the home information of the at least one network function. The NWDAF selection assistance information may further include the network function type of an NWDAF. The NWDAF selection assistance information includes at least one of the following pieces of information: slice information of the network function, an identifier of the network function, or location information of the network function. The slice information of the network function represents the slice information to which the network function belongs. For example, through slice information of an NWDAF service and the slice information to which the network function belongs, it can be determined whether the network function is located within the service area of the NWDAF. The identifier of the network function represents various pieces of network function information, for example, a network function identifier, an AF identifier or an OAM identifier. The location information of the network function represents a geographical location, a tracking area, an IP address, a cell, operator information, vendor information and other information of the network function for effectively distinguishing between service areas.

After receiving the query request message sent by the source NWDAF, the NRF queries information of the NWDAF to which the at least one network function belongs, that is, information of the target NWDAF, according to the NWDAF selection assistance information. For example, the NWDAF serving the network function is queried by the NRF according to the identifier of the network function of the query request message, or the NWDAF serving the slice or the location is queried by the NRF according to the slice information or the location information of the network function, and then the NRF determines the NWDAF serving the network function according to an association between network slices and network functions. Then, the source NWDAF receives the query response message sent by the NRF, where the query response message includes the information of the target NWDAF. The information of the target NWDAF includes, for example, an identifier of the target NWDAF and/or capability information of the target NWDAF, etc.

After the information of the target NWDAF is queried, the source NWDAF may send a network function data collection request to the target NWDAF, and receive a network function data collection response sent by the target NWDAF, thereby collecting network data fed back by the network function.

In an embodiment, the query response message includes information of multiple target NWDAFs, and the at least one network function is located within service areas of the multiple target NWDAFs, respectively.

In an embodiment, the NRF receives a registration request message or an update request message sent by the source NWDAF and/or the target NWDAF, where the registration request message or the update request message includes service area information of the source NWDAF and/or the target NWDAF.

In an embodiment, the service area information of an NWDAF includes at least one of the following pieces of information: slice information of an NWDAF service, a network function identifier of an NWDAF service, or location information of an NWDAF service.

In an embodiment, the registration request message or the update request message further includes at least one of the following pieces of information: a network function type of an NWDAF, a network function identifier of an NWDAF, a service capability supported by an NWDAF, or a home operator identifier of an NWDAF.

The network data collection methods provided in the present application are described below in several embodiments.

Figure 6:
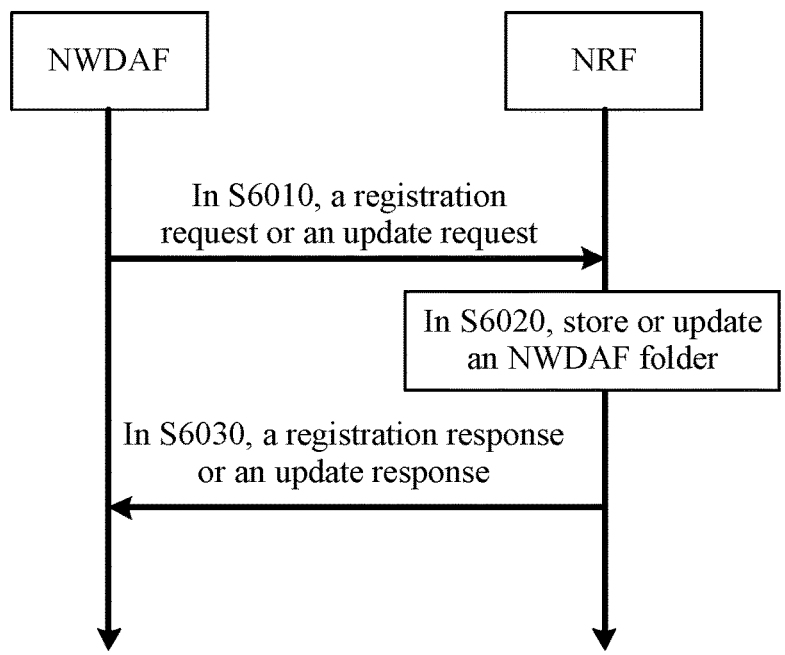
FIG. 6 is a flowchart of another network data collection method according to an embodiment.

FIG. 6 is a flowchart of another network data collection method according to an embodiment. As shown in FIG. 6, the method provided in this embodiment includes the following.

In S6010, an NWDAF sends a registration request or an update request to an NRF.

An NWDAF network function sends a registration request message or an update request message to the NRF. The registration request message or the update request message includes at least one of the following pieces of information: a network function type of the NWDAF, a network function identifier of the NWDAF, a service capability supported by the NWDAF, a home operator identifier, or service area information of the NWDAF. The service area information of the NWDAF includes at least one of the following parameters: slice information of a service, a network function identifier of a service, or location information of a service. The slice information of the service is used for representing the slice of the service. For example, whether the network function is within the service area of the NWDAF may be determined through the slice information of the NWDAF service and slice information to which the network function belongs. The network function identifier of the service is used for representing various pieces of network function information of the service, such as a network function identifier, an AF identifier, an OAM identifier, etc. The location information of the service represents a geographical location, a tracking area, an IP address, a cell, operator information, vendor information and other information of the server for effectively distinguishing between service areas.

In S6020, the NRF stores or updates an NWDAF folder.

In S6030, the NRF sends a registration response or an update response to the NWDAF.

The embodiment provides the method for NWDAF registration or updating.

Figure 7:
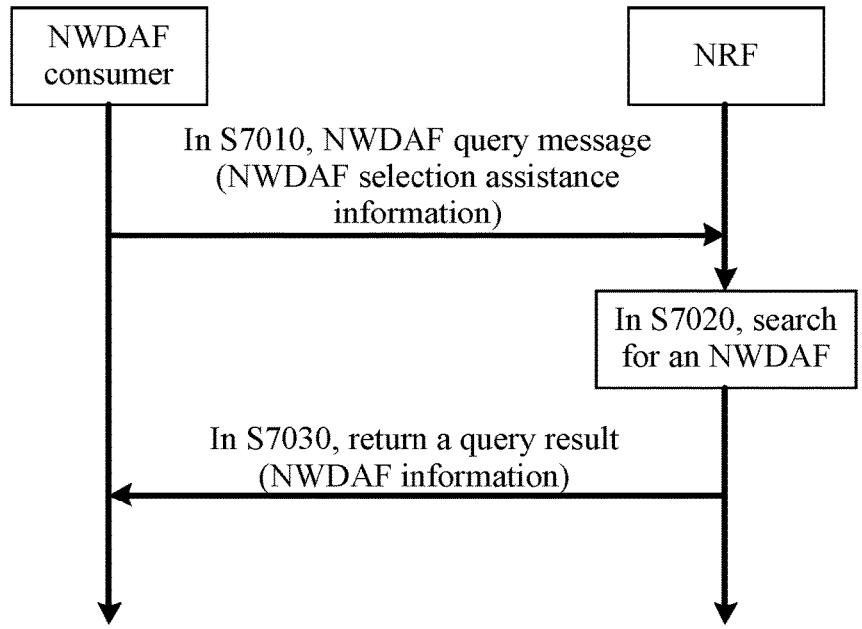
FIG. 7 is a flowchart of another network data collection method according to an embodiment.

FIG. 7 is a flowchart of another network data collection method according to an embodiment. As shown in FIG. 7, the method provided in this embodiment includes the following.

In S7010, an NWDAF consumer sends a query message to an NRF.

The NWDAF consumer sends the query message to the NRF to query a required NWDAF network function. The NWDAF consumer represents various network functions, such as the AF, and the OAM and the like, needing to use an NWDAF service. The query message includes at least one of the following pieces of information: a network function type of an NWDAF or NWDAF selection assistance information. The NWDAF selection assistance information includes at least one of the following pieces of information: slice information, a network function identifier, or location information.

In S7020, the NRF searches for an NWDAF.

After receiving the query message, the NRF searches for the required NWDAF network function according to NWDAF selection assistance information. For example, the NWDAF serving the network function is queried by the NRF according to the network function identifier of the query message, or the NWDAF serving the slice or the location is queried by the NRF according to the location information or the slice information to which the network function belongs, and then the NRF determines the NWDAF serving the network function according to an association between network slices and network functions.

In S7030, the NRF sends a query result to the NWDAF consumer.

The NRF returns the query result that includes the found NWDAF information (for example, an identifier of the NWDAF and/or capability information of the NWDAF, etc.).

The embodiment provides the method for finding and selecting the NWDAF.

Figure 8:
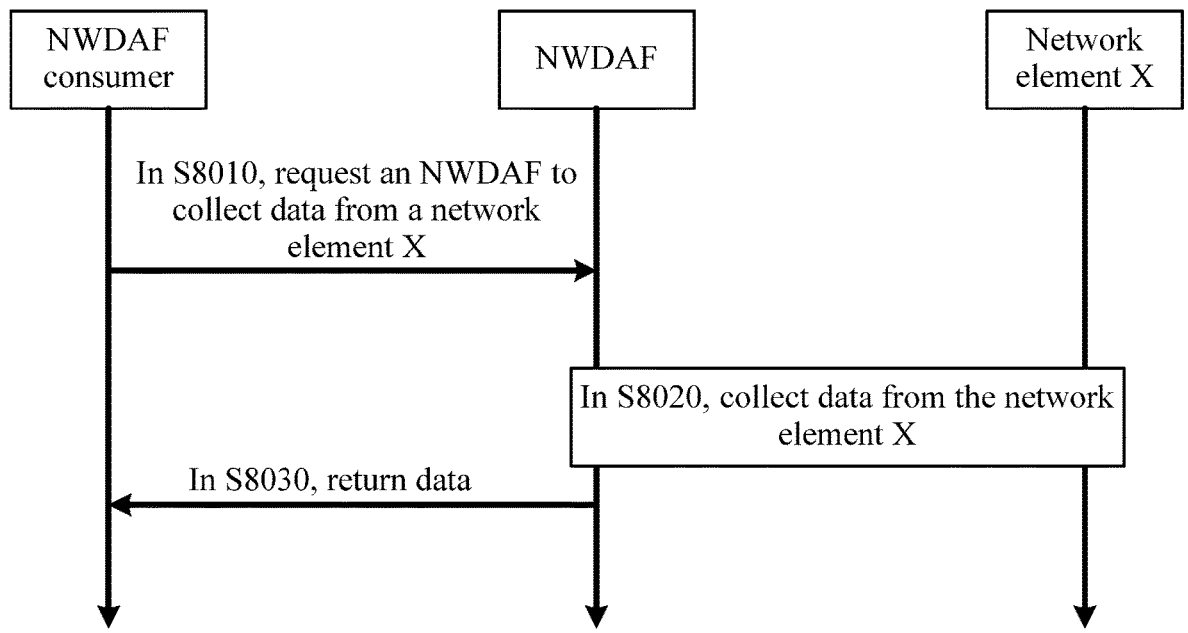
FIG. 8 is a flowchart of another network data collection method according to an embodiment.

FIG. 8 is a flowchart of another network data collection method according to an embodiment.

As shown in FIG. 8, the method provided in this embodiment includes the following.

In S8010, an NWDAF consumer sends a data collection request to an NWDAF to request collected data of a network function X.

The NWDAF consumer is the network function using an NWDAF service, for example, the NF, AF and OAM of the 3GPP. The NWDAF consumer may also be an NWDAF network function, that is, an NWDAF network function may request another NWDAF network function to perform a data collection service. The NWDAF consumer sends a message to the NWDAF to request data collection from the network function X. The message includes at least one of the following pieces of information: addressing information of the network function X, a data collection strategy of the network function X, content of data required to be collected from the network function X, or a receiving object of collected data of the network function X.

In S8020, the NWDAF collects data from the network function X.

In S8030, the NWDAF returns the collected network data to the NWDAF consumer.

In the embodiment, the data recipient is the NWDAF consumer itself, so that the collected data is returned to the NWDAF consumer.

The embodiment provides the method for NWDAF data collection.

Figure 9:
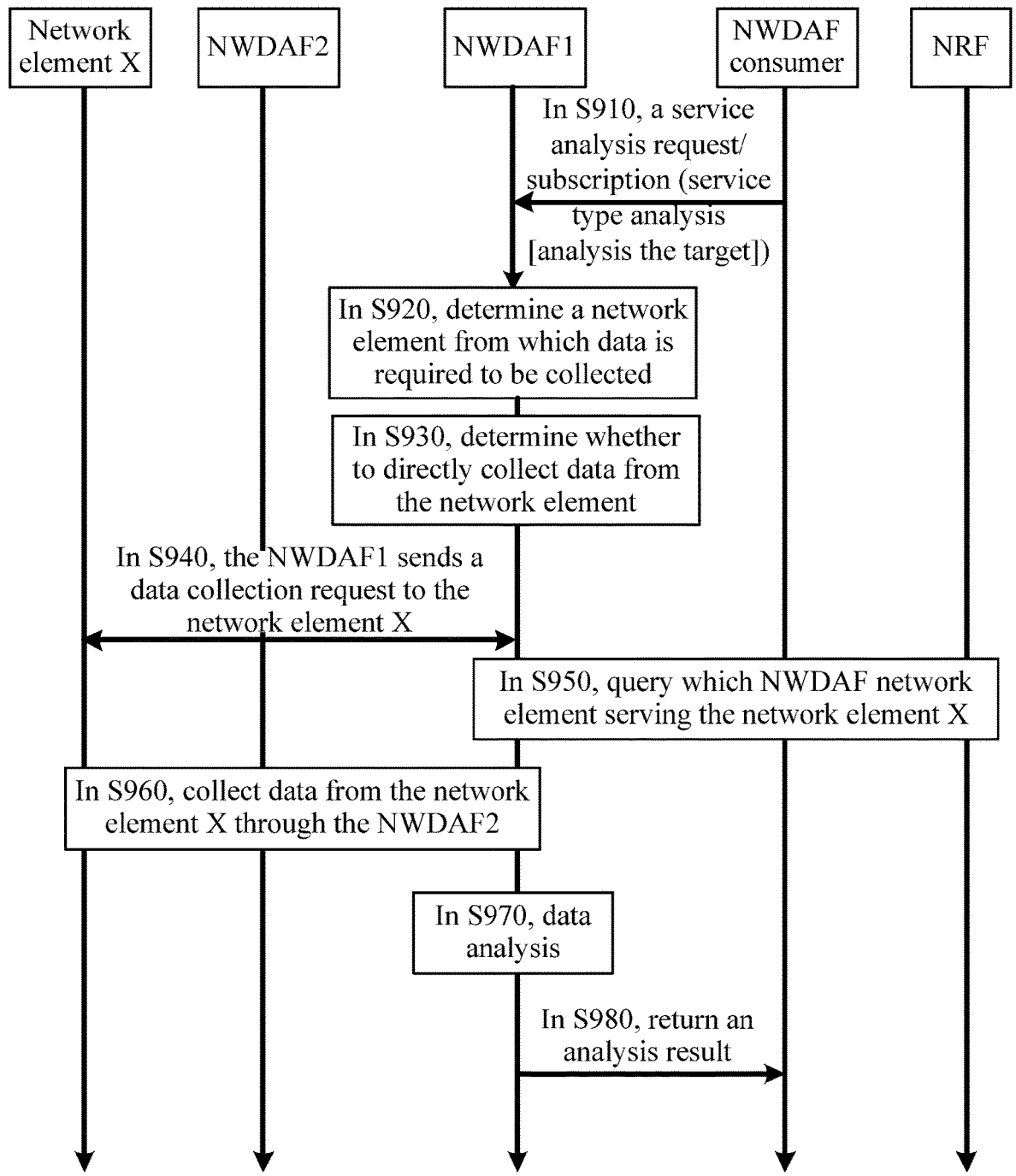
FIG. 9 is a flowchart of another network data collection method according to an embodiment.

FIG. 9 is a flowchart of another network data collection method according to an embodiment. As shown in FIG. 9, the method provided in this embodiment includes the following.

In S910, an NWDAF consumer sends a service analysis request or a subscription message to an NWDAF1.

The embodiment provides the method for data collection and analysis across service areas of NWDAFs. First, the following information needs to be preconfigured: an NWDAF consumer knows that the NWDAF service analysis network function serving this NWDAF consumer is the NWDAF1. The NWDAF1 and an NWDAF2 are already registered in an NRF, as shown in the embodiment of FIG. 7. The NWDAF1 and the NWDAF2 may belong to the same PLMN or different PLMNs. In the embodiment, it is assumed that a network function X belongs to the service area of the NWDAF2 and does not belong to the service area of the NWDAF1. The network function X in the embodiment represents a Network Function (NF), an AF or an OAM of the 3GPP.

The NWDAF consumer sends the service analysis request and/or the subscription message to the NWDAF1. The message includes at least the following parameter combinations: a service type, analysis target association information, an analysis result notification object, etc. The analysis target association information is assistance information used to determine a network function from which data is required to be collected for service type analysis, for example, the analysis target association information may be location information, a network function identifier, a UE identifier, an AF identifier, slice information or other association information that may be used for assisting in determining the analysis target.

In S920, the NWDAF1 determines a network element X from which data is required to be collected.

After receiving the service analysis message, the NWDAF1 determines from which network functions data is required to be collected for service analysis according to the current service analysis request. For example, the NWDAF1 may determine the type of the network function from which data is required to be collected according to service type analysis, and determine the network function from which data is required to be collected according to the analysis target association information via the UDM, the NRF, the BSF, the AMF, or the NEF. In the embodiment, it is assumed that the determined network function is the network function X.

In S930, the NWDAF1 determines whether to directly collect data from the network element X.

The NWDAF1 determines whether to collect data from the network function X. If it is allowed to collect data from the network function X, the NWDAF1 collects data from the network function X by using S940. If it is not allowed to collect data from the network function X, S950 is executed.

In S940, the NWDAF1 directly collects data from the network element X.

The NWDAF1 sends a data collection message to the network function X. The message includes at least the content of data required to be collected, a collection strategy, etc. Then, S970 is executed.

In S950, the NWDAF1 queries that the NWDAF to which the network element X belongs is the NWDAF 2 through the NRF.

The NWDAF1 queries which NWDAF serves the network function X from the NRF. The method is shown in the embodiment of FIG. 7. It is assumed that the query result of the embodiment is that the NWDAF2 serves the network function X.

In S960, the NWDAF1 collects data from the network element X through the NWDAF2.

The NWDAF1 sends a data collection request message to the NWDAF2 to request data collection from the network function X and acquisition of the required and collected data.

In S970, the NWDAF1 performs data analysis.

In S980, the NWDAF1 sends an analysis result to the NWDAF consumer.

Figure 10:
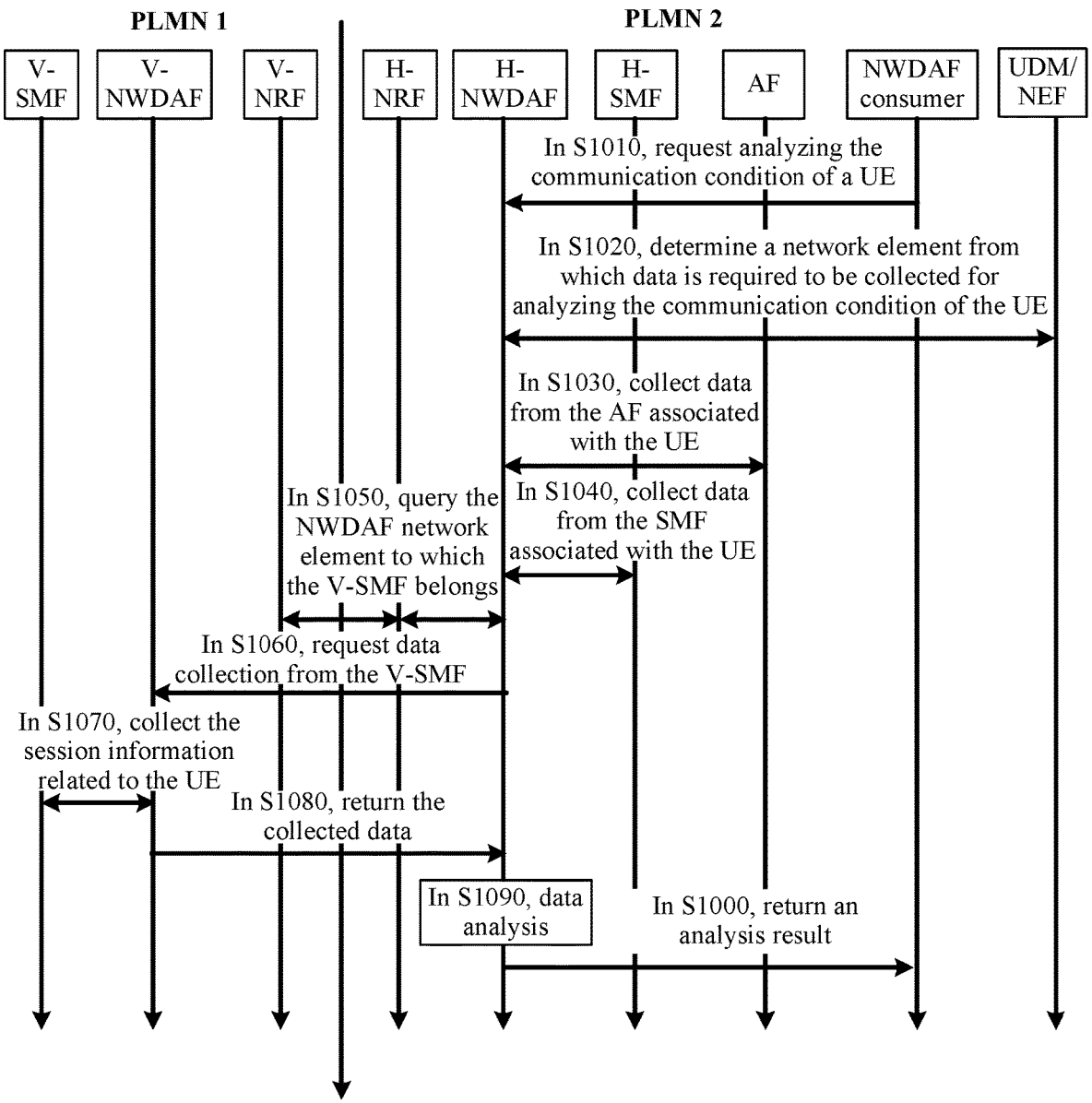
FIG. 10 is a flowchart of another network data collection method according to an embodiment.

FIG. 10 is a flowchart of another network data collection method according to an embodiment. As shown in FIG. 10, the method provided in this embodiment includes the following.

In S1010, an NWDAF consumer sends a message to an H-NWDAF for requesting analysis of a communication condition of a UE.

The embodiment provides the method for analyzing the communication condition of the UE in a roaming state. In the embodiment, it is assumed that a certain UE is registered in a network operator PLMN 2 and roams to a PLMN 1. A V-SMF (visit SMF), a V-NWDAF (visit NWDAF) and a V-NRF (visit NRF) represent network functions of the visited PLMN 1. The H-NWDAF (home NWDAF) and an H-SMF (home SMF) represent network functions of the home PLMN 2. An AF is an application function associated with the UE. The embodiment describes a process for analyzing the communication condition of the UE. The NWDAF consumer may be a certain Network Function (NF), an AF or an OAM of the 3GPP in the network.

The NWDAF consumer sends a message for requesting the analysis of the communication condition of the UE. The message may be an Nnwdaf_AnalyticsSubscription_Subscribe message or an Nnwdaf_AnalyticsInfo_Request message. The message carries a service analysis type (a type of the communication condition of the UE), analysis target association information (a UE-related identifier) and other information.

In S1020, the H-NWDAF determines a network element from which data is required to be collected for analyzing the communication condition of the UE.

An H-NWDAF network function receives the request, determines that it is necessary to collect data from AF and SMF network functions for analyzing the communication condition of the UE. The NWDAF sends a query message to a UDM or an NEF to query the AF network function and the SMF network function associated with the UE. The NWDAF receives an AF identifier, a V-SMF identifier and an H-SMF identifier of the network functions associated with the UE fed back by a query result.

The H-NWDAF determines whether the network element functions (the AF, V-SMF and H-SMF) from which data is required to be collected are within the service area of the H-NWDAF. In the embodiment, the AF and the H-SMF are within the service area of the H-NWDAF, and data collection is performed directly through S1030 and S1040. The V-SMF is not within the service area of the H-NWDAF, and S1050 is executed.

In S1030, the H-NWDAF collects data from the AF associated with the UE.

The H-NWDAF network function requests data collection from the AF associated with the UE, for example, information such as uplink and downlink data rates.

In S1040, the H-NWDAF collects data from the SMF associated with the UE.

The H-NWDAF network function requests data collection from the H-SMF associated with the UE, such as session information associated with the UE.

In S1050, the H-NWDAF queries the NWDAF to which the V-SMF belongs.

Since the V-SMF is not within the service area of the H-NWDAF, the H-NWDAF queries the NWDAF network function to which the V-SMF belongs from the V-NRF through the H-NRF. The query message carries the network function type of the NWDAF and the V-SMF identifier. The H-NWDAF obtains the network function identifier of the V-NWDAF serving the V-SMF.

In S1060, the H-NWDAF requests data collection from the V-SMF.

An H-NWDAF consumer sends a message to the V-NWDAF to request data collection from the V-SMF network function. The message carries information such as content of collected data (for example, session information related to the UE), the network function identifier of the collected object V-SMF, etc.

In S1070, the V-NWDAF collects the session information related to the UE from the V-SMF.

In S1080, the V-NWDAF returns the collected data to the H-NWDAF.

In S1090, the H-NWDAF performs data analysis.

In S1000, the H-NWDAF returns an analysis result to the NWDAF consumer.

Figure 11:
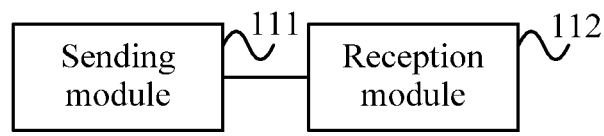
FIG. 11 is a structural diagram of a network data collection device according to an embodiment.

FIG. 11 is a structural diagram of a network data collection device according to an embodiment. As shown in FIG. 11, the network data collection device provided in the embodiment is configured at a source NWDAF and includes a sending module 111 and a reception module 112.

The sending module 111 is configured to send a network function data collection request to a target NWDAF, where the network function data collection request includes a data collection assistance parameter of at least one network function. The reception module 112 is configured to receive a network function data collection response sent by the target NWDAF, where the network function data collection response includes network data fed back by the at least one network function.

The network data collection device provided in the embodiment is configured to implement the network data collection method of the embodiment shown in FIG. 2. The network data collection device provided in the embodiment has similar implementation principles and technical effects, which are not repeated here.

Figure 12:
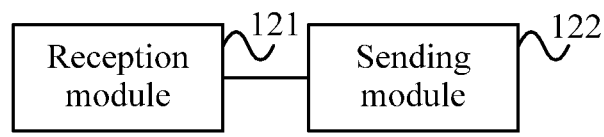
FIG. 12 is a structural diagram of another network data collection device according to an embodiment.

FIG. 12 is a structural diagram of another network data collection device according to an embodiment. As shown in FIG. 12, the network data collection device provided in the embodiment is configured at an NRF and includes a reception module 121 and a sending module 122.

The reception module 121 is configured to receive a query request message sent by a source Network Data Analytics Function (NWDAF), where the query request message includes NWDAF selection assistance information, and the NWDAF selection assistance information includes home information of at least one network function. The sending module 122 is configured to send a query response message to the source NWDAF, where the query response message includes information of a target NWDAF, and the at least one network function is located within the service area of the target NWDAF.

The network data collection device provided in the embodiment is configured to implement the network data collection method of the embodiment shown in FIG. 5. The network data collection device provided in the embodiment has similar implementation principles and technical effects, which are not repeated here.

Figure 13:
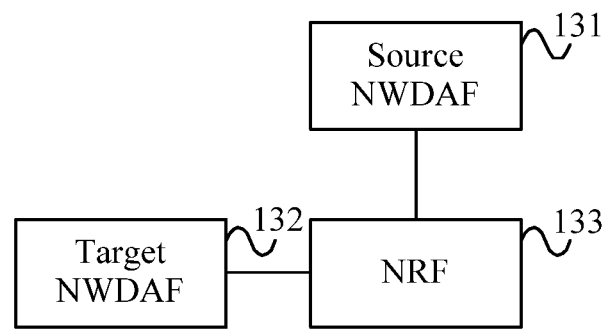
FIG. 13 is a structural diagram of a network data collection system according to an embodiment.

FIG. 13 is a structural diagram of a network data collection system according to an embodiment. As shown in FIG. 13, the network data collection system provided in the embodiment includes a source NWDAF 131, a target NWDAF 132 and an NRF 133. Multiple NWDAFs may exist in the network data collection system, which is not limited to the embodiment. The source NWDAF 131 includes the network data collection device shown in FIG. 11, and the NRF 133 includes the network data collection device shown in FIG. 12.

Figure 14:
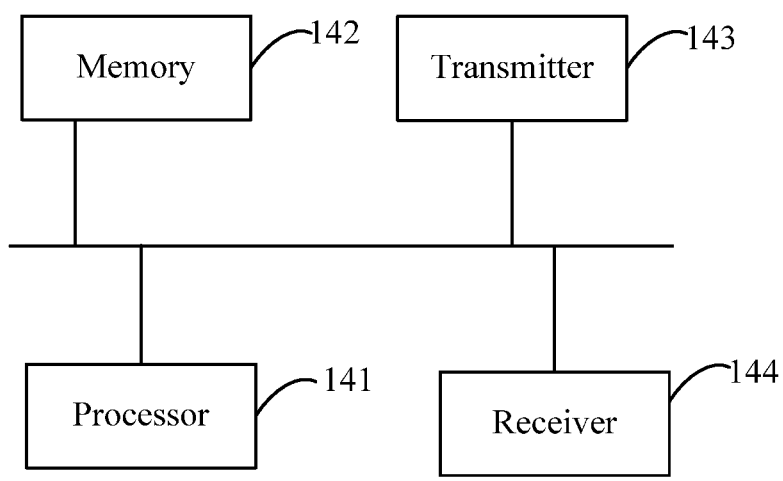
FIG. 14 is a structural diagram of a network device according to an embodiment.

FIG. 14 is a structural diagram of a network device according to an embodiment. As shown in FIG. 14, the network device includes a processor 141, a memory 142, a transmitter 143 and a receiver 144. One or more processors 141 may be provided in the network device, and one processor 141 is used as an example in FIG. 14. The processor 141, the memory 142, the transmitter 143 and the receiver 144 in the network device may be connected through a bus or in other manners. In FIG. 14, the connection through the bus is used as an example.

As a computer-readable storage medium, the memory 142 may be configured to store software programs and computer-executable programs and modules, such as program instructions/modules (for example, the sending module 111 and the reception module 112 in the network data collection device) corresponding to the network data collection method of the embodiments shown in FIG. 2 to FIG. 4 of the present application. The processor 141 runs the software programs, the instructions and the modules that are stored in the memory 142 to complete at least one of the function applications and data processing of the network device, that is, to implement the preceding network data collection method.

The memory 142 may mainly include a program storage region and a data storage region. The program storage region may store an operating system and an application program required by at least one function. The data storage region may store data created depending on the use of a terminal. Moreover, the memory 142 may include a high-speed random-access memory, and may further include a nonvolatile memory such as at least one disk memory, flash memory or another nonvolatile solid state memory.

The transmitter 143 is a combination of modules or devices capable of transmitting radio frequency signals into space and includes, for example, a combination of a radio frequency transmitter, an antenna and another device. The receiver 144 is a combination of modules or devices capable of receiving radio frequency signals from space and includes, for example, a combination of a radio frequency receiver, an antenna and another device.

Figure 15:
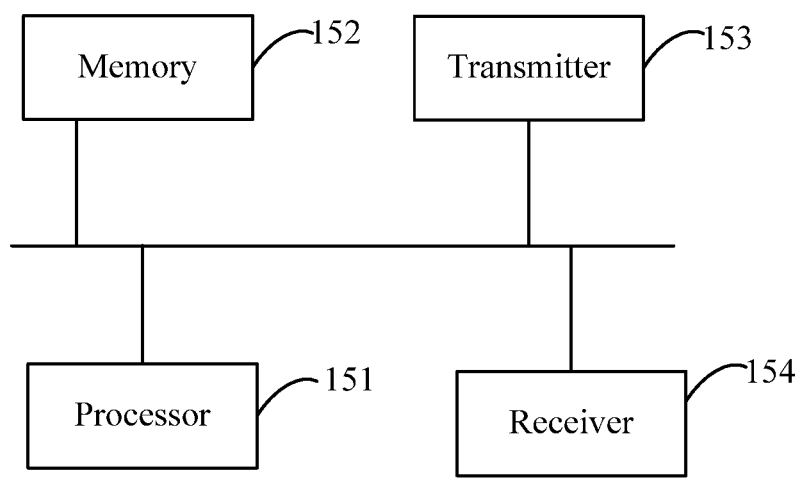
FIG. 15 is a structural diagram of another network device according to an embodiment.

FIG. 15 is a structural diagram of a network device according to an embodiment. As shown in FIG. 15, the network device includes a processor 151, a memory 152, a transmitter 153 and a receiver 154. One or more processors 151 may be provided in the network device, and one processor 151 is used as an example in FIG. 15. The processor 151, the memory 152, the transmitter 153 and the receiver 154 in the network device may be connected through a bus or in other manners. In FIG. 15, the connection through the bus is used as an example.

As a computer-readable storage medium, the memory 152 may be configured to store software programs and computer-executable programs and modules, such as program instructions/modules (for example, the reception module 121 and the sending module 122 in the network data collection device) corresponding to the network data collection method of the embodiment shown in FIG. 5 of the present application. The processor 151 runs the software programs, the instructions and the modules that are stored in the memory 152 to complete at least one of the function applications and data processing of the network device, that is, to implement the preceding network data collection method.

The memory 152 may mainly include a program storage region and a data storage region. The program storage region may store an operating system and an application program required by at least one function. The data storage region may store data created depending on the use of a terminal. Moreover, the memory 152 may include a high-speed random-access memory, and may further include a nonvolatile memory such as at least one disk memory, flash memory or another nonvolatile solid state memory.

The transmitter 153 is a combination of modules or devices capable of transmitting radio frequency signals into space and includes, for example, a combination of a radio frequency transmitter, an antenna and another device. The receiver 154 is a combination of modules or devices capable of receiving radio frequency signals from space and includes, for example, a combination of a radio frequency receiver, an antenna and another device.

An embodiment of the present application further provides a storage medium including computer-executable instructions, and the computer-executable instructions are configured to execute a network data collection method when executed by a computer processor. The method includes the following. A source NWDAF sends a network function data collection request to a target NWDAF, where the network function data collection request includes data collection assistance information of at least one network function from which data collection is requested. The source NWDAF receives a network function data collection response sent by the target NWDAF, where the network function data collection response includes network data fed back by the at least one network function.

An embodiment of the present application further provides a storage medium including computer-executable instructions, and the computer-executable instructions are configured to execute a network data collection method when executed by a computer processor. The method includes the following. An NRF receives a query request message sent by a source NWDAF, where the query request message includes NWDAF selection assistance information, and the NWDAF selection assistance information includes home information of at least one network function. The NRF sends a query response message to the source NWDAF, where the query response message includes information of a target NWDAF, and the at least one network function is located within the service area of the target NWDAF.

The preceding is only exemplary embodiments of the present application and is not intended to limit the scope of the present application.

The term user terminal encompasses any appropriate type of wireless user devices, such as a mobile phone, a portable data processing apparatus, a portable web browser or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, though the present application is not limited thereto.

The embodiments of the present application may be implemented by computer program instructions executed by a data processor of a mobile apparatus, for example, in a processor entity, by hardware, or by a combination of software and hardware. The computer program instructions may be assembly instructions, Instruction Set Architecture (ISA) instructions, machine instructions, machine-related instructions, microcode, firmware instructions, state setting data, or source codes or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable to the local technical environment and may be implemented using any suitable data storage technology such as, but not limited to, a Read-Only Memory (ROM), a Random-Access Memory (RAM), an optical memory device and system (a Digital Video Disc (DVD) or a Compact Disc (CD)) and the like. Computer-readable media may include a non-transitory storage medium. The data processor may be of any type suitable to the local technical environment such as, but not limited to, a general-purpose computer, a special-purpose computer, a microprocessor, a Digital Signal Processing (DSP), an Application-Specific Integrated Circuit (ASIC), a Field-Programmable Gate Array (FPGA), and a processor based on a multi-core processor architecture.

What is claimed is:

1. A network data collection method, comprising:
   sending, by a source Network Data Analytics Function (NWDAF), a query request message to a Network Repository Function (NRF), wherein the query request message comprises NWDAF selection assistance information, and the NWDAF selection assistance information comprises home information of at least one network function;
   receiving, by the source NWDAF, a query response message sent by the NRF, wherein the query response message comprises information of a target NWDAF, and the at least one network function is located within a service area of the target NWDAF;
   sending, by the source NWDAF, a network function data collection request to the target NWDAF, wherein the network function data collection request comprises a data collection assistance parameter of the at least one network function; and
   receiving, by the source NWDAF, a network function data collection response sent by the target NWDAF, wherein the network function data collection response comprises network data fed back by the at least one network function.

2. The method according to claim 1, wherein the query response message comprises information of a plurality of target NWDAFs, and the at least one network function is located within service areas of the plurality of target NWDAFs, respectively.

3. The method according to claim 2, wherein sending, by the source NWDAF, the network function data collection request to the target NWDAF comprises:
- sending, by the source NWDAF, network function data collection requests respectively to the plurality of target NWDAFs, wherein each of the network function data collection requests comprises a data collection assistance parameter of a network function among the at least one network function; and
- wherein receiving, by the source NWDAF, the network function data collection response sent by the target NWDAF comprises:
- receiving, by the source NWDAF, network function data collection responses respectively sent by the plurality of target NWDAFs, wherein each of the network function data collection responses comprises network data fed back by a network function among the at least one network function.

4. The method according to claim 2, before sending, by the source NWDAF, the network function data collection request to the target NWDAF, further comprising:
- receiving, by the source NWDAF, a service analysis request sent by an NWDAF consumer; and
- determining, by the source NWDAF, the data collection assistance parameter of the at least one network function from which data is required to be collected according to the service analysis request;
- wherein after receiving, by the source NWDAF, the network function data collection response sent by the target NWDAF, the method further comprises:
- performing, by the source NWDAF, service analysis processing according to the network function data collection response, and sending a service analysis result to the NWDAF consumer.

5. The method according to claim 1, wherein the home information of the at least one network function comprises at least one of the following pieces of information:
- slice information of one of the at least one network function, an identifier of one of the at least one network function, or location information of one of the at least one network function.

6. The method according to claim 1, before sending, by the source NWDAF, the query request message to the NRF, further comprising:
- determining, by the source NWDAF, whether to directly collect the network data of the at least one network function;
- wherein sending, by the source NWDAF, the query request message to the NRF comprises:
- in a case where the source NWDAF is not capable of directly collecting the network data of the at least one network function, sending, by the source NWDAF, the query request message to the NRF.

7. The method according to claim 1, wherein the data collection assistance parameter comprises at least one of the following pieces of information:
- addressing information of one of the at least one network function, a data collection strategy of one of the at least one network function, content of data required to be collected from one of the at least one network function, or a receiving object of collected data of one of the at least one network function.

8. The method according to claim 1, before sending, by the source NWDAF, the network function data collection request to the target NWDAF, further comprising:
- receiving, by the source NWDAF, a service analysis request sent by an NWDAF consumer; and
- determining, by the source NWDAF, the data collection assistance parameter of the at least one network function from which data is required to be collected according to the service analysis request;
- wherein after receiving, by the source NWDAF, the network function data collection response sent by the target NWDAF, the method further comprises:
- performing, by the source NWDAF, service analysis processing according to the network function data collection response, and sending a service analysis result to the NWDAF consumer.

9. The method according to claim 8, wherein the NWDAF consumer comprises one of Operations Administration and Maintenance (OAM), an Application Function (AF), or a network function using a service capability of the source NWDAF.

10. The method according to claim 1, further comprising:
- sending, by the source NWDAF, a registration request message or an update request message to the NRF, wherein the registration request message or the update request message comprises service area information of the source NWDAF.

11. The method according to claim 10, wherein the service area information comprises at least one of the following pieces of information:
- slice information of an NWDAF service, a network function identifier of an NWDAF service, or location information of an NWDAF service.

12. The method according to claim 10, wherein the registration request message or the update request message further comprises at least one of the following pieces of information:
- a network function type of an NWDAF, a network function identifier of an NWDAF, a service capability supported by an NWDAF, or a home operator identifier of an NWDAF.

13. A network data collection method, comprising:
- receiving, by a Network Repository Function (NRF), a query request message sent by a source Network Data Analytics Function (NWDAF), wherein the query request message comprises NWDAF selection assistance information, and the NWDAF selection assistance information comprises home information of at least one network function; and
- sending, by the NRF, a query response message to the source NWDAF, wherein the query response message comprises information of a target NWDAF, and the at least one network function is located within a service area of the target NWDAF.

14. The method according to claim 13, wherein the query response message comprises information of a plurality of target NWDAFs, and the at least one network function is located within service areas of the plurality of target NWDAFs, respectively.

15. The method according to claim 13, wherein the home information of the at least one network function comprises at least one of the following pieces of information:
- slice information of one of the at least one network function, an identifier of one of the at least one network function, or location information of one of the at least one network function.

16. The method according to claim 13, further comprising:
- receiving, by the NRF, a registration request message or an update request message sent by at least one of the source NWDAF or the target NWDAF, wherein the registration request message or the update request message comprises service area information of the at least one of the source NWDAF or the target NWDAF.

17. The method according to claim 16, wherein the service area information comprises at least one of the following pieces of information:
   slice information of an NWDAF service, a network function identifier of an NWDAF service, or location information of an NWDAF service.

18. The method according to claim 16, wherein the registration request message or the update request message further comprises at least one of the following pieces of information:
   a network function type of an NWDAF, a network function identifier of an NWDAF, a service capability supported by an NWDAF, or a home operator identifier of an NWDAF.

19. A network data collection device, configured at a Network Repository Function (NRF), comprising: at least one processor; and a memory configured to store at least one program;
   Wherein when the at least one program is executed by the at least one processor, the at least one processor is caused to implement the network data collection method according to claim 13.

20. A network data collection device, configured at a source Network Data Analytics Function (NWDAF), comprising: at least one processor; and a memory configured to store at least one program;

wherein when the at least one program is executed by the at least one processor the at least one processor is caused to implement the following:

sending a query request message to a Network Repository Function (NRF), wherein the query request message comprises NWDAF selection assistance information, and the NWDAF selection assistance information comprises home information of at least one network function;

receiving a query response message sent by the NRF, wherein the query response message comprises information of a target NWDAF, and the at least one network function is located within a service area of the target NWDAF;

sending a network function data collection request to the target NWDAF, wherein the network function data collection request comprises a data collection assistance parameter of the at least one network function; and receiving a network function data collection response sent by the target NWDAF, wherein the network function data collection response comprises network data fed back by the at least one network function.

* * * * *